United States Patent
Krawitt

[11] 3,809,066
[45] May 7, 1974

[54] MEDICAL SENSOR DEVICE FOR LOCATING CALCULI IN BODY CAVITIES

[76] Inventor: Donald R. Krawitt, Rock Ledge Rd., Rye, N.Y. 10580

[22] Filed: Feb. 3, 1972

[21] Appl. No.: 223,184

[52] U.S. Cl............. 128/2 R, 128/6, 235/61.11 E, 350/96 B, 356/215
[51] Int. Cl.............................................. A61b 5/06
[58] Field of Search............... 128/2 R, 2 L, 4, 5, 6, 128/7, 8, 9, 21, 22, 395; 350/96 B; 356/215; 340/258 R, 258 B; 250/227; 235/61.11 E

[56] References Cited
UNITED STATES PATENTS

| | | | |
|---|---|---|---|
| 3,610,891 | 10/1971 | Raciazek | 235/61.11 E |
| 3,533,657 | 10/1970 | Da Silva | 235/61.11 E |
| 3,523,740 | 8/1970 | Peter et al. | 356/215 |
| 3,461,856 | 8/1969 | Polanyl | 128/2 L |
| 3,068,739 | 12/1962 | Hicks, Jr. et al. | 350/96 B |
| 3,123,066 | 3/1964 | Brumley | 128/2 L |
| 3,136,310 | 6/1964 | Meltzer | 128/2 L |
| 3,335,715 | 8/1967 | Hugenholtz et al. | 128/2 L |
| 3,674,013 | 7/1972 | Polanyi | 128/2 R |

*Primary Examiner*—Lucie H. Laudenslager
*Attorney, Agent, or Firm*—Charles E. Temko

[57] ABSTRACT

A device for detecting the presence of kidney stones, gallstones and the like in situ within a body cavity. The device includes a fiber optic light conducting probe, the free end of which is introduced into a duct leading to the suspected cavity. Where the free end contacts tissue or organic matter, light emanating from the tip of the probe is diffused into the material. However, where the free end contacts inorganic material, the light is not diffused, but is reflected back through the probe to be sensed at the opposite end thereof, thus giving an indication of the presence of such material.

2 Claims, 4 Drawing Figures

MEDICAL SENSOR DEVICE FOR LOCATING CALCULI IN BODY CAVITIES

This invention relates generally to the field of internal medicine, and more particularly to a device for detecting the presence of calculi in the form of stones in various organs. More particularly, the invention relates to a device of a type which may be readily utilized by those having little or no training in radiology, and which permits a diagnosis to be obtained within a relatively short period of time.

DESCRIPTION OF THE PRIOR ART

Kidney and gallstones have traditionally been detected by resort to radiology, either by the taking of x-ray films or fluoroscopy. While such procedures, when properly used, are very accurate, both films and fluoroscope techniques have very obvious disadvantages. In the case of x-ray filming, the effect of radiation is lessened, but considerable skill is required in the taking of the x-ray photographs. A period of time is lost during which the films are processed, and following this, the reading of the processed films requires knowledge and skill not possessed by all members of the medical profession. In the case of fluoroscopy, the danger of radiation is substantially greater, although diagnosis may be obtained instantaneously.

BRIEF SUMMARY OF THE INVENTION

Briefly stated, the invention contemplates the sensing of the presence of inorganic material within the body by utilization of the fact that collimated light is readily diffused within tissue and organic material present within a body cavity, and is not diffused by inorganic material. The invention contemplates the provision of a fiber optic probe of diameter sufficiently small to permit its insertion through ducts leading to suspected organs, so that the end of the probe may contact material present within the organ to transmit light to the surface of such material. Light is introduced at the outer end of the probe, and the presence of reflected light above a threshold level is sensed externally of the cavity to indicate the presence of a stone or other foreign body.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
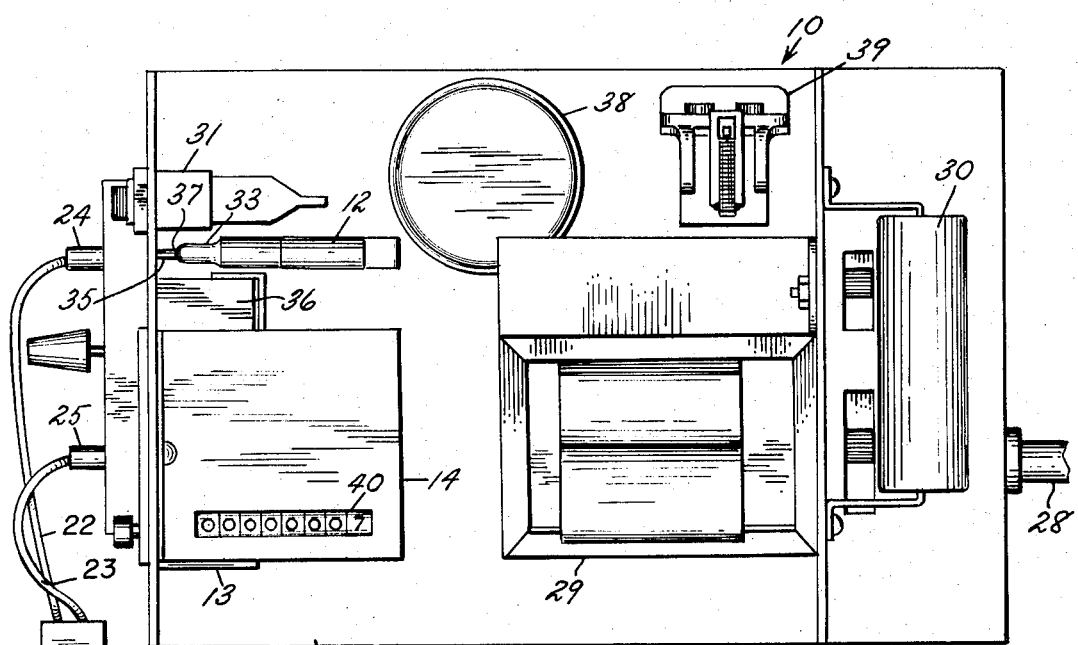
FIG. 1 is a schematic, fragmentary top plan view of an embodiment of the invention.

In accordance with the invention, the device, generally indicated by reference character 10, comprises broadly: a fiber optic probe element 11, light source means 12, light sensing means 13 and signal means 14.

Figure 2:
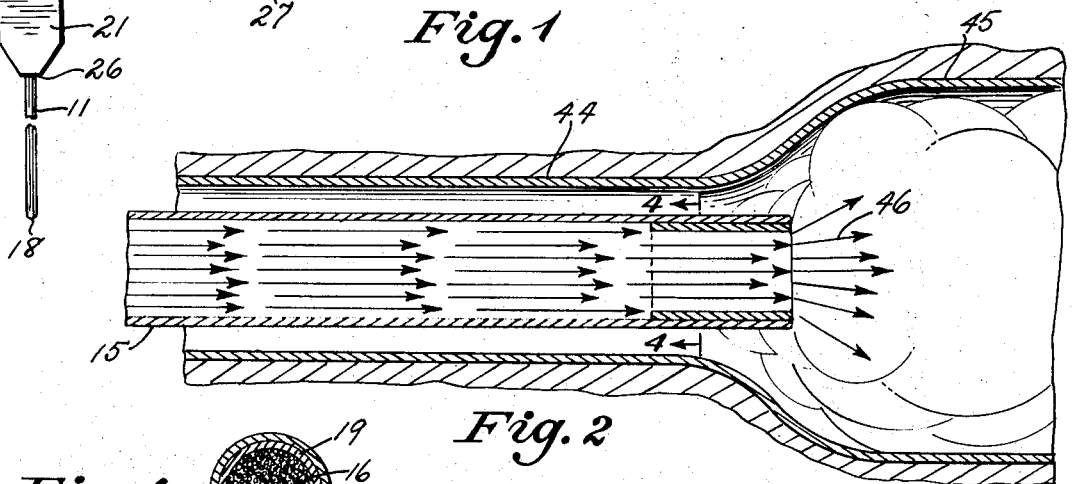
FIG. 2 is a schematic, fragmentary view showing the insertion of a probe element forming a part of the embodiment within a body cavity.
Figure 4:
FIG. 4 is a sectional view as seen from the plane 4—4 in FIG. 2.

The probe element 11 includes a continuous length of fiber optic cable 15 formed of a plurality of light fibers 16 (FIGS. 2 and 4). These are covered by a synthetic resinous sheath 17, the outer surface of which is capable of producing little friction. A free end 18 is provided with a metal ferrule 19 to hold the ends of the fibers 16 in close proximity. An opposite end 26 terminates in a bifurcating terminal 21 from which extend first and second conductors 22 and 23, respectively, each having the outer segments of substantially half of the fibers 16. The conductors 22-33 terminate in pin terminals 24 and 25, respectively.

The means 12-14, inclusive, are most conveniently mounted on a small electronic chassis 27 which includes a power cord 28, a transformer 29, a large resistor 30 and a main power switch 31.

The light source means 12 includes a small incandescent lamp 33 mounted upon the chassis 27 of a type having a meniscus focusing lens 37 at a free end thereof which directs light into a collimating tube 35 leading to the conductor 22. The lamp 33 is powered by a low voltage tap (not shown) of the transformer 29.

The means 13 includes a cadmium sulphide light sensitive resistive means 36 also mounted on the chassis 27 connected in series with a variable resistance sensitivity control, and is adapted to operate on very low voltage. The voltage used to operate the lamp 33 is passed through the resistor 30 to obtain this voltage. As seen in FIG. 1, the member 36 is positioned to sense light emanating from the second conductor 23, and cause current to flow to a condensor 38 which stores energy up to a threshhold level. Upon reaching this level, the condensor is discharged to operate a relay switch 39 causing current to flow from the transformer 29 to operate the signal means 14.

The signal means 14 may be in the form of a small electric counter 40, and may include auxiliary buzzer or light means (not shown). The counter 40 permits actuation at relatively low light levels, and permits the rechecking of a sensed body a number of times to verify a diagnosis.

Figure 3:
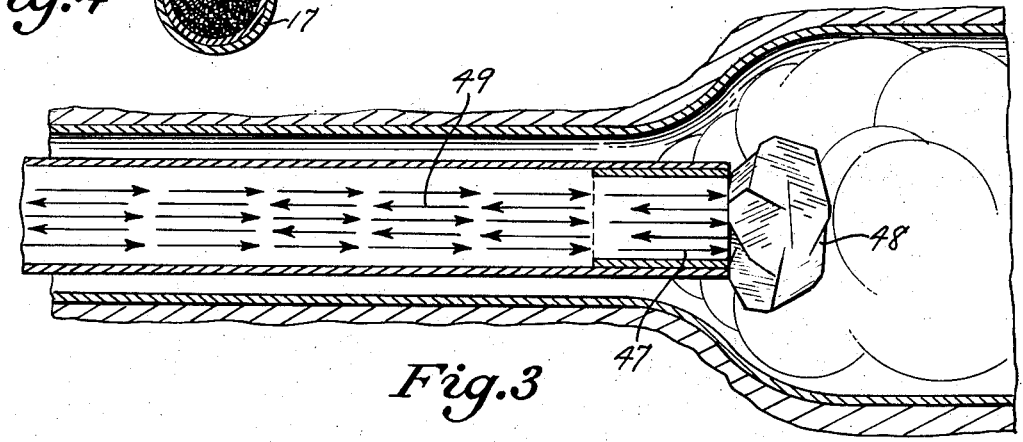
FIG. 3 is a similar fragmentary, schematic view, corresponding to that seen in FIG. 2, but showing the detection of an inorganic body within the cavity.

Operation of the device is relatively simple. The free end 18 of the probe element is introduced into the body of the patient in a manner similar to that employed in the introduction of a catheter. The probe travels through a duct 44 into the organ 45 being examined. Where, as shown in FIG. 2, the free end of the probe strikes only tissue or other organic matter, the light rays 46 are diffused into the tissue, and no light returns down the length of the probe. As seen in FIG. 3, where the outgoing light rays 47 strike the surface of inorganic material 48, no diffusion occurs, and the light rays are reflected off the surface of the inorganic material and return as indicated by reference character 49 down other of the fibers 16 to be sensed by the means 13. Very often, the stone will be sufficiently small that several probing actions are necessary, and repeated actions will not necessarily contact the stone each time. In such cases, when a direct contact is obtained, the step counter 40 will advance one digit, giving the indication of the possible presence of a stone, and repeated probings will cause further advancement of the counter verifying this condition.

The diagnosis obtained by the above procedure can, of course, be confirmed by radiology, which will specifically locate the stone. However, the above procedure can be conveniently and safely conducted within the physician's office, even by physicians having little or no training in radiology, permitting a decision to be made as to whether or not the patient should be hospitalized.

I wish it to be understood that I do not consider the invention limited to the precise details of structure shown and set forth in this specification, for obvious modifications will occur to those skilled in the art to which the invention pertains.

I claim:

1. A device for locating the presence of agglomerated calculi in body cavities comprising: a fiber optic probe element having a plurality of light-conducting fibers in parallel relation extending to a first end terminal, said fibers being bifurcated at an opposite end of said (cable) probe element into first and second groups of fibers forming second and third terminals; a collimated light source connected to said second terminal of said proble element, and arranged to conduct light thereto for transmission to said first end terminal, light-reactive means including energy storing means connected to said third terminal to detect the presence of cumulative light pulses emanating therefrom above a threshold degree of illumination, and signal means indicating the presence of reflected light above said level; whereby upon the insertion of said first terminal into a body cavity, and the momentary contact of the same with a detected body of calculi, a light pulse may be reflected to said light reactive means, successive momentary contacts serving to raise the stored level of energy to said threshold value for actuation of said signal means.

2. Structure in accordance with claim 1, in which said means detecting the presence of light includes a cadmium sulphide component and a condensor.

* * * * *